United States Patent [19]

Dierker, Jr. et al.

[11] Patent Number: 4,862,028
[45] Date of Patent: Aug. 29, 1989

[54] EXCITER ROTOR ASSEMBLY

[75] Inventors: Joseph B. Dierker, Jr., Southfield; Glen D. Peterson, Battle Creek; Thomas A. Gee, Allen Park, all of Mich.

[73] Assignee: Eaton Corporation, Cleveland, Ohio

[21] Appl. No.: 236,569

[22] Filed: Aug. 25, 1988

[51] Int. Cl.$^4$ .......................................... H02K 19/20
[52] U.S. Cl. ..................................... 310/168; 310/71; 310/83; 310/89; 310/114; 324/174
[58] Field of Search ................... 310/71, 83, 89, 114, 310/168, 169, 170; 324/160, 174

[56] References Cited

U.S. PATENT DOCUMENTS

| | | | |
|---|---|---|---|
| 3,604,760 | 9/1971 | Atkins | 303/21 CG |
| 3,719,841 | 3/1973 | Ritsema | 310/168 |
| 3,769,533 | 10/1973 | Pauwels | 310/168 |
| 3,842,299 | 10/1979 | Lomard | 310/168 |
| 3,854,556 | 12/1974 | Gee | 310/156 |
| 3,927,339 | 12/1975 | Paul et al. | 310/168 |
| 3,938,112 | 2/1976 | Gee | 310/168 |
| 3,947,711 | 3/1976 | Presley et al. | 310/168 |
| 3,961,214 | 6/1976 | Lokkart | 310/168 |
| 3,961,215 | 6/1976 | Gee et al. | 310/168 |
| 3,984,713 | 10/1976 | Presley | 310/168 |
| 4,090,592 | 5/1978 | Jovick et al. | 310/168 |
| 4,724,935 | 2/1988 | Roper et al. | 310/168 |

Primary Examiner—Patrick R. Salce
Assistant Examiner—Anita M. Ault
Attorney, Agent, or Firm—H. D. Gordon

[57] ABSTRACT

An in-axle wheel speed sensor exciter rotor assembly (100) for sensing the rotational speeds of a drive axle ring gear (14/30) and a drive axle differential side gear (48) is provided. The assembly includes a tubular member (102) having teeth (110) for engagement with slots (112) provided on the side gear hub (48a) and carrying a first exciter rotor (116) at the opposite end (114) thereof. A second exciter rotor (118) is axially retained on the tubular member axially adjacent the first exciter rotor and is rotatable relative thereto. The second exciter rotor carries a coupling device (124/128) for engagement with threaded bores (126) provided in the drive axle ring gear/carrier assembly to rotationally couple the second exciter rotor to the ring gear and to axially retain the assembly (100) within the drive axle.

24 Claims, 4 Drawing Sheets

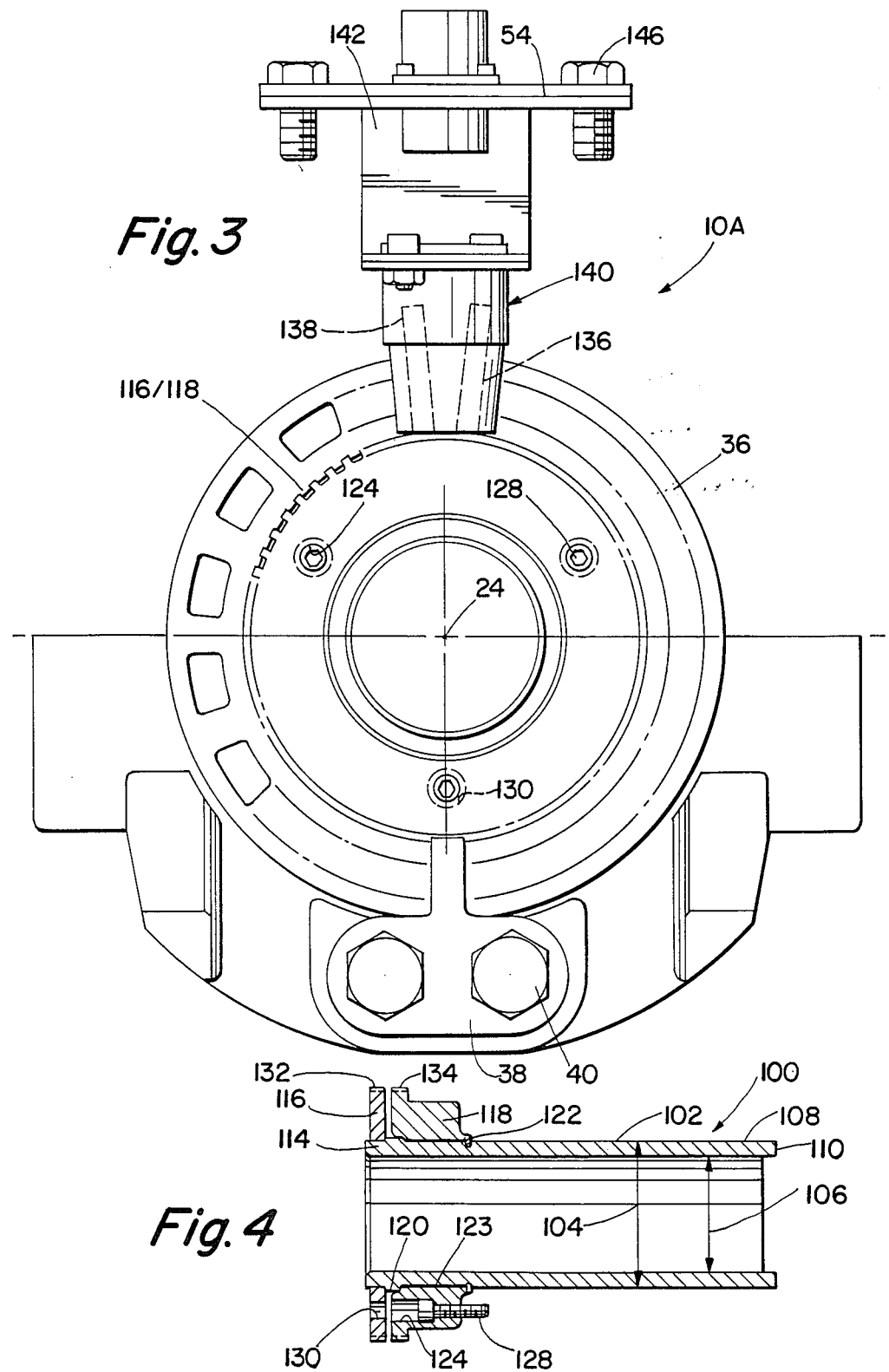

EXCITER ROTOR ASSEMBLY

RELATED APPLICATIONS

This application is related to U.S. Patent application Ser. No. 236,570, title DUAL SPEED SENSOR PICKUP ASSEMBLY, filed the same day and assigned to the same assignee as this application.

BACKGROUND OF THE INVENTION

1. Field of the Invention

The present invention relates to a speed sensor assembly for drive axles. In particular, the present invention relates to a speed sensor assembly mounted to the differential head portion of a drive axle housing for sensing the rotational speed of the driven ring gear and of one of the differential side gears. More particularly, the present invention relates to dual exciter rotor assembly for a speed sensor assembly of the general type described above which is assembled to and removed from the drive axle assembly as a unitary preassembled subassembly and which is rotationally supported on a relative stable member.

2. Description of the Prior Art

ABS or anti-lock brake systems are well known in the prior art as may be seen by reference to U.S. Pat. Nos. 3,604,760; 3,719,841; 3,767,270; 3,854,556; 3,995,912; 3,929,382 and 3,929,383, the disclosures of all of which are hereby incorporated by reference. Briefly, these systems utilize speed sensors, usually a separate sensor assembly at each of the axle ends of each monitored vehicle axle, to sense individual or average rotational wheel speed and to provide signals indicative thereof. Logic means are utilized to receive and process the signals in accordance with predetermined logic rules to determine if an impending or actual wheel-lock condition exists and to issue command output signals to modify the braking force applied to monitored and/or controlled brake sites.

Simplifying such systems by utilizing a single sensor mounted in a relatively protected location within the drive axle housing for sensing the rotational speed of the differential gearing which will provide an average wheel speed signal, is also known in the prior art as may be seen by reference to U.S. Pat. Nos. 3,719,841 and 4,724,935, the disclosures of which are incorporated by reference.

The use of an in-axle wheel speed sensor assembly mounted in the drive axle housing adjacent the differential gearing for sensing an average wheel speed value and an individual wheel speed value (from which both wheel speed values may be calculated) is known in the prior art as may be seen by reference to U.S. Pat. No. 3,769,533, the disclosure of which is incorporated by reference.

While the prior art in-axle speed sensor assemblies are improvements over sensor assemblies mounted at the wheel ends as the sensors and exciters are located at a more protected location and the signals are required to travel a shorter distance and thus be less subject to damage and/or electromagnetic interference, such assemblies were not totally satisfactory as only an average wheel speed was sensed, mounting of the exciter rotors to the gearing required considerable time and/or modification of the existing gearing, cross-talk interference between two closely spaced sensor pickups was not minimized and/or one or more of the sensors was fixed to an axle shaft causing runout errors relative to the pick-up associated therewith.

SUMMARY OF THE INVENTION

In accordance with the present invention, the drawbacks of the prior art have been minimized by the provision of a dual, in-axle speed sensor assembly for sensing the rotational speeds of the ring gear and of one of the differential side gears, which is quickly and easily mounted to the existing axle gearing with only a minimum of modification thereto. The speed sensor assembly comprises the exciter rotor assembly of the present invention and a pickup assembly.

The exciter rotor assembly is a preassembled subassembly having a first exciter rotor mountable for rotation with the ring gear or a member, such as a differential carrier, rotatable with the ring gear, and a coaxial closely axially spaced second exciter rotor mountable for rotation with one of the side gears. The exciter rotor assembly includes an elongated tubular portion having the second exciter rotor fixed at one end thereof. The first exciter rotor is axially fixed to the tubular portion and just inboard of the second rotor and is carried for independent rotation. The other end of the tubular portion carries a plurality of teeth or slots for axial engagement with complimentary slots or teeth provided in the one side gear. The first rotor has a plurality of equally spaced bores corresponding with tapped bores provided in an outwardly facing surface of the carrier for receipt of mounting bolts by which the first rotor is fixed for rotation with the ring gear/carrier and the exciter rotor assembly is fixed to the drive axle.

The slots/teeth provided in the one side gear and the tapped bores provided in the carrier are the only modifications required to the otherwise standard axle gearing. Alignment of the tube, teeth/slots with the side gear slots/teeth and insertion of the bolts into through bores provided in the first rotor and into the carrier tapped bores are the only operations required to assemble the exciter rotor assembly to the drive axle.

A sensor assembly comprising a pair of separate pole pieces, one for each exciter rotor, is mountable to the axle housing with the pole pieces axially aligned with the rotors. The pole pieces are skewed with respect to one another, but extend radially relative to the exciter rotors, to minimize possible electromagnetic cross-talk interference therebetween.

Accordingly, it is an object of the present invention to provide an easily installed and disassembled in-axle dual exciter rotor assembly for a drive axle speed sensor assembly which requires a minimum of modification to standard drive axle components.

This and other objects and advantages of the present invention will become apparent from a reading of the detailed description of the preferred embodiment taken in view of the drawings.

BRIEF DESCRIPTION OF THE DRAWINGS

FIG. 3 is a partial sectional view taken along the lines 3—3 in FIG. 2.

FIG. 4 is an enlarged elevational view of the exciter rotor assembly of the present invention.

DESCRIPTION OF THE PREFERRED EMBODIMENT

Figure 1:
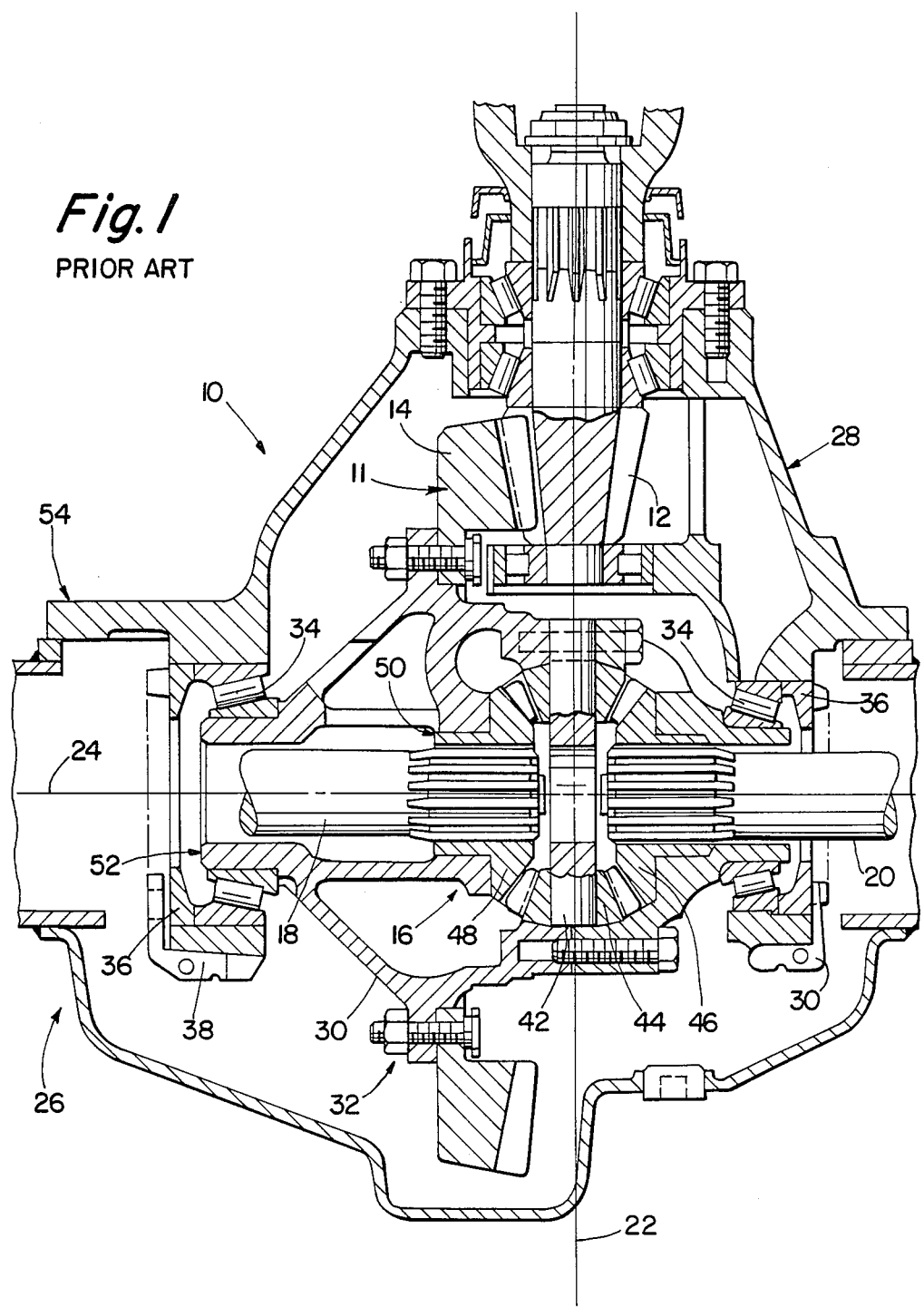
FIG. 1 is a partial sectional view of a typical prior art heavy-duty drive axle of the type to which the exciter rotor assembly of the present invention is utilized.

In the following description of the present invention, certain terms will be utilized for purposes of reference only and are not intended to be limiting. The terms "upward", "downward", "rightward" and "leftward" refer to directions in the drawings to which reference is made. The words "inward" and "outward", respectively, refer to directions towards and away from, respectively, the geometric center of the device described. Said terminology will include the words above specifically mentioned, derivatives thereof and words of similar import.

Heavy-duty drive axles utilizing ring gear/pinion gear right angle gear-sets are well known in the prior art. Referring to FIG. 1, a single reduction drive axle 10 utilizing such a gear-set 11 comprising a pinion gear 12 meshingly engaged with a ring gear 14 is illustrated. A differential assembly 16 is fixed to the ring gear for driving the two axle shafts 18 and 20. Axle shafts 18 and 20 drive the left and righthand, respectively, drive wheels (not shown) as is well known in the prior art. The axis of rotation 22 of the pinion gear 14 is substantially perpendicular to the axis of rotation 24 of ring gear 14 (and the differential 16 and axle shaft 18 and 20). Heavy-duty drive axles of this, and of the two-speed planetary double reduction type, are well known in the prior art.

The drive axle assembly includes an axle housing 26 having a differential head portion 28. The ring gear 14 is mounted for rotation with a differential carrier 30 by means of bolt and nut assemblies 32. The differential carrier is rotationally supported in the housing portion 28 by means of taper bearings 34 which are adjustably positioned by bearing adjusters 36 which are maintained in position by bearing adjuster lock members 38, and bolts 40.

The differential carrier 30 carries the differential spider member 42 on which are rotatably received the differential pinion gears 44. The differential pinion gears are constantly meshed with a righthand and lefthand side gear, 46 and 48, respectively, which side gears are rotatably engaged by the drive shafts 20 and 18 by means of a splined connection as is well known in the prior art. As is also well known in the prior art, the rotational speed of ring gear 14, and differential carrier 30 which rotates therewith, is equal to the average speed of the side gears 46 and 48. Accordingly, if the rotational speed of any two of ring gear 14, side gear 46 and side gear 48 is known, the rotational speed of the other of the gears may be easily determined. Further details may be seen by reference to above-mentioned U.S. Pat. No. 3,769,533.

To utilize the exciter rotor assembly of the present invention with a standard drive axle of the type illustrated in FIG. 1, only the leftwardly facing axial surface 50 of side gear 48, a leftwardly facing axial surface 52 of the carrier 30 and possibly surface 54 of the housing portion 28 require modification as will be described in detail below.

Figure 2:
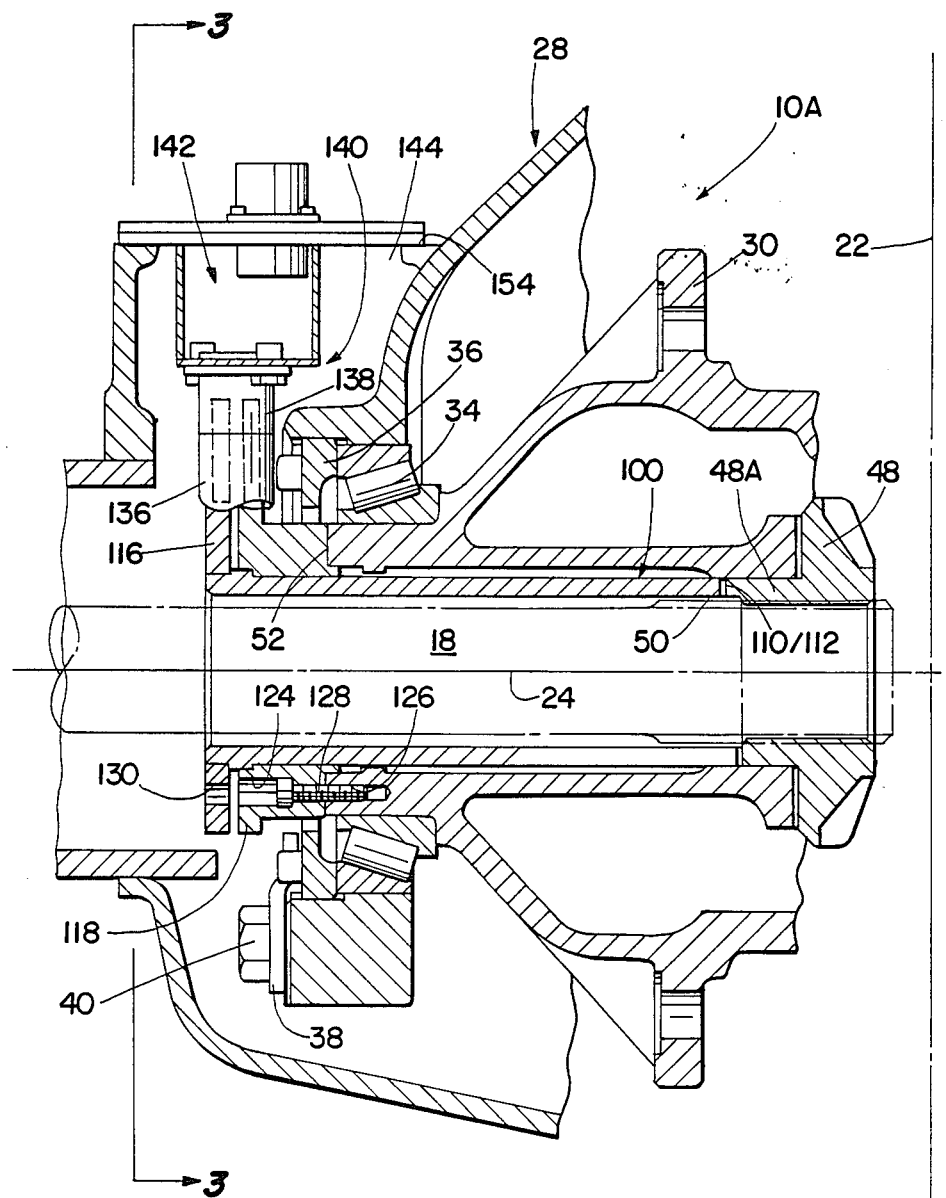
FIG. 2 is a partial sectional view of a drive axle assembly similar to FIG. 1 in which the exciter rotor assembly of the present invention and the speed pickup assembly have been mounted.

The exciter rotor assembly 100 of the present invention may be seen by reference to FIG. 4 and as installed in a drive axle 10a, substantially identical to drive axle 10 described in FIG. 1 above, and by reference to FIGS. 2 and 3.

Exciter rotor assembly 100 includes a generally tubular member 102 having an outer diameter 104 generally equal to the outer diameter of the hubbed portion 48a of side gear 48 and an inner diameter 106 slightly greater than the outer diameter of axial shaft 18 allowing the axle shaft 18 to be received within the tubular portion 102. At its rightward or inboard end 108 the tubular portion is provided with a pair of axially inwardly extending projections or teeth 110 which are engagable with axially extending slots 112 opening to the surface 50 of the hub portion 48a of side gear 48. Engagement of the projection teeth 110 in the slots 112 will, of course, rotationally couple the tube 102 to the side gear 48. At its leftward or outboard end 114, the tubular portion carries an exciter rotor 116 fixed thereto as by welding or the like. Exciter rotor 116 will, accordingly, rotate with side gear 48, axle shaft 18 and the wheel end driven thereby wherein the teeth 110 and slots 112 are interengaged.

Another exciter rotor 118 is rotatably carried by tubular member 102 immediately axially adjacent exciter rotor 116. Preferably, exciter rotor 118 is axially positioned on the tubular member 102 between a shoulder portion 120 separating the two exciter rotors and a snap-ring 122. An anti-friction bushing or bearing 123 may be utilized to support rotor 118 on tubular member 102. Exciter rotor 118 is provided with a plurality of through bores 124 generally equally circumferentially spaced about the rotor. The leftwardly axially facing surface 52 of carrier 30 is provided with a complimentary set of tapped blind bores 126 for threaded receipt of bolts or cap screws 128 by which the exciter rotor 118 is rotationally fixed to the differential carrier 30 and the assembly 100 is axially retained within the drive axle 10a. The rotor 116 is provided with one or more through bores 130 on a bolt circle having the same diameter as bores 124 and 126 allowing access to the bolts or cap screws 128 by a screwdriver, elonwrench, or the like. Accordingly, by modifying axle 10a, relative to standard axle 10, only by providing slots 112 in surface 50 of the side gear hub 48a and internally threaded bores 126 in surface 52 of the differential carrier 30, the exciter rotor assembly 100 may be easily assembled to the drive axle by means of three cap screws or bolts 128 which are threadably received in or removed from the threaded bores 126 from the exterior of the drive axle through the axial bore 130 provided in rotor 116. Preferably, the cap screws 128 have larger heads than the bore 130 to capture the cap screws in the exciter assembly.

As may be seen by reference to FIG. 2, the inner end 108 of tubular member 102 is piloted in the same bore in carrier 30 that hub of side gear 48 is piloted to minimize runout of the tubular member 102, and of rotors 116 and 118, relative to axis of rotation 24.

Exciter rotor 116 and 118, respectively, are provided with teeth 132 and 134, respectively, which will rotate past the axially spaced electromagnetic sensor pole members 136 and 138, respectively, which are contained in the pickup assembly 140. Preferably, to minimize electromagnetic interference, the central processing unit, or CPU, for processing the input signals from pickups 136 or 138, 142 is integral with or attached directly to the pickup assembly 140. The speed sensor pickup assembly 140 and CPU 142 are mounted at an opening 144 provided in surface 54 of the housing 26. Preferably, opening 144 may be the opening commonly utilized with two speed axle actuators and/or differential lockup actuators of the types illustrated in U.S. Pat. Nos. 3,503,280; 3,502,177 and 3,358,517, the disclosures of all of which are hereby incorporated by reference. Alternatively, opening 144 may be provided in surface 54 as well as two threaded blind bores for receipt of mounting bolts 146.

The operation, structure and function of electromagnetic speed sensor assemblies comprising an exciter rotor and a pickup or therefor member is well known in the prior art as may be seen by reference to U.S. Pat. Nos. 3,854,556; 3,938,112; 3,961,215; 3,988,624 and 3,961,214, the disclosures of all of which are hereby incorporated by reference. Briefly, in a typical electromagnetic speed sensor assembly, rotation of the exciter rotor past the pickup member will induce an electromagnetic or potential current having pulses or a frequency proportional to the relative rotational speed of the rotor.

Figure 5A:
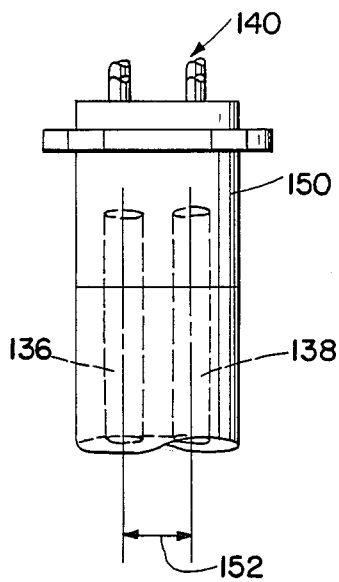
FIGS. 5A, 5B, 5C and 5D are front, side, top and prospective views, respectively, of the speed sensor pickup assembly of the present invention.
Figure 5B:
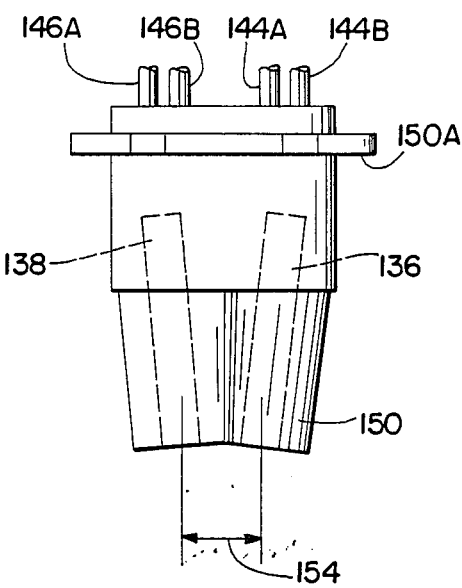
Figure 5C:
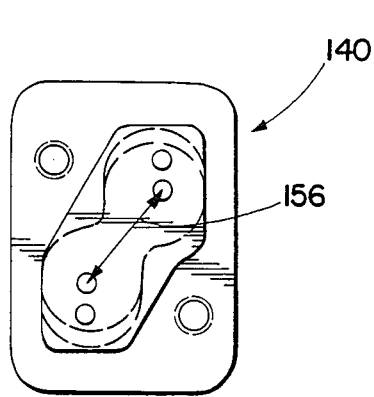

To minimize the possibility of electromagnetic crosstalk interference between the two independent pole pieces 136 and 138, the pole pieces are circumferentially offset from one another as may be seen in FIG. 5C and are skewed relative to one another as may be seen by reference to FIG. 5B. Briefly, as may be seen by reference to FIG. 5B, each of the pole pieces are skewed about six degrees (6°) relative to vertical in opposite directions and thus are skewed by an angle of approximately twelve degrees (12°) relative to one another. However, the axes of the pole pieces are radial relative to the axes of rotation of the exciter rotors 116 and 118. It has been found that by utilizing the sensor assembly structure described above, even if utilizing two relatively closely axially spaced sensors, electromagnetic cross-talk between the two independent sensors is greatly minimized to an acceptable level.

Figure 5D:
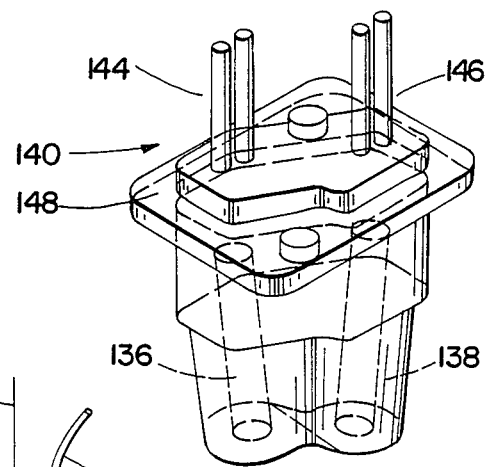

The sensor pickup assembly 140 may be seen in a perspective view in FIG. 5d.

The sensor pickup assembly 140 comprises the two pole pieces which are preferably of a permanent magnet material, around each of which is wrapped a coil of wire 144 and 146, respectively, the opposite ends of each of which coils, 144a and 144b and 146a and 146b, respectively, extend from the assembly 140. The pickup assembly also includes a mounting plate 148 and a block of epoxy resin 150 in which the pole pieces and coils are encapsulated by being pottedor molded. Measured in a direction parallel to axis 24, the pole pieces are separated by an axial distance 152 generally equal to the axial separation of the exciter rotor teeth 132 and 134 of exciter rotors 116 and 118 on exciter rotor assembly 100. However, as the pole pieces are circumferentially offset, the ends of the pole pieces, when measured in a direction perpendicular to axes 24 and 22 (see FIG. 5B) are separated by a distance 154 which exceeds distance 152. The actual separation of the inner ends of the pole pieces 156, as may best be seen by reference to FIG. 5C is maximized by circumferentially offsetting the pole pieces to the extent possible within the block of epoxy 150. By maximizing the separation of the pole pieces, and by orienting the pole pieces on skewed axes relative to one another while retaining the axes radial to the axis of rotation of the exciter rotors, the accuracy of the speed sensor pickups is maximized while the tendency for electromagnetic cross-talk interference is minimized.

Figure 6:
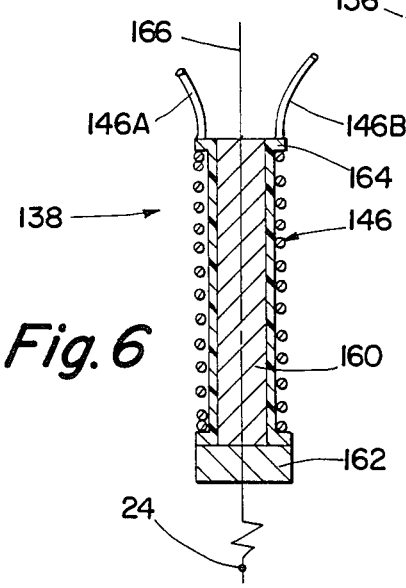
FIG. 6 is an enlarged sectional view of a pole piece utilized in the speed sensor pick-up assembly.

A somewhat schematic illustration of one of the pole piece assemblies may be seen by reference to FIG. 6. Briefly, each of pole piece assemblies, such as assembly 138 comprises a pole member 160 which is a cylindrical piece of ferromagnetic material, such as iron or steel. Fixed to the bottom end of the pole member 160 is a generally disk shaped permanent magnet 162. A nylon bobbin 164 slips over the pole member 160 and carries the coil 146. The pole member 160 defines an axis 166 which is maintained substantially radial relative to axis of rotation 24 of exciter rotor 116.

Accordingly, it may be seen, that a dual speed sensor assembly comprising exciter rotor subassembly and a pickup subassembly which are easily mounted to a relatively standard axle, which require relatively minor modification of the parts of a relatively standard axle and which minimize the tendency for electromagnetic cross-talk interference between the two separate sensors has been provided by the present invention.

Although the present invention has been described with a certain degree of particularity, it is understood that various modifications and rearrangements of the parts thereof are possible without departing from the spirit and the scope of the invention as hereinafter claimed.

We claim:

1. An exciter rotor assembly (100) for a drive-axle wheel speed sensor for sensing the rotational speeds of a drive axle ring gear (14/30) and of a drive axle differential side gear (48), said assembly characterized by:
    a generally tubular member (102), said tubular member having first coupling means (110) at one end (108) thereof for engagement with complimentary second coupling means (112) on the side gear for joining said tubular member and said side gear for joint rotation;
    a first exciter rotor (116) fixed to said tubular member at the other end (114) thereof; and,
    a second exciter rotor (118) axially fixed to said tubular member axially adjacent said first exciter rotor, said second exciter rotor axially displaced from said first exciter rotor in the direction towards said one end, said second exciter rotor rotatable relative to said tubular member and provided with third coupling means (124/128) for rotationally and axially fixing said second exciter rotor to said ring gear.

2. The exciter rotor assembly of claim 1 wherein said first coupling means comprises axially extending projections (110) extending from said one end (108) of said tubular member and said second coupling means comprises slots (112) provided in a hub portion (48a) of said side gear for axial receipt of said projections.

3. The exciter rotor assembly of claim 2 wherein said drive axle (10a) includes a differential carrier (30) fixed for rotation with said ring gear, said third coupling means comprising threaded fasteners (128) extending from said second exciter rotor for threaded receipt in bores (126) provided in said differential carrier.

4. The exciter rotor assembly of claim 3 wherein said first exciter rotor (116) has a through bore (130) allowing access therethrough from said other end to said threaded fastener.

5. The exciter rotor assembly of claim 4 wherein said side gear has a hub portion (48a), the outer diameter (104) and inner diameter (106) of said tubular member (102) are generally equal to the outer diameter and inner diameter, respectively, of said hub portion of said side gear.

6. The exciter rotor assembly of claim 2 wherein said side gear has a hub portion (48a), the outer diameter (104) and inner diameter (106) of said tubular member (102) are generally equal to the outer diameter and inner diameter, respectively, of said hub portion of said side gear.

7. The exciter rotor assembly of claim 6 wherein said side gear hub and tubular member are piloted in a common support bore for rotation about a common axis of rotation.

8. The exciter rotor assembly of claim 2 wherein said tubular portion (102) defines a radially outwardly extending shoulder (120) axially interposed between said first and second exciter rotors to maintain the axial separation therebetween, said assembly also including a retaining ring (122) received on the outer diameter surface of said tubular portion for maintaining said second exciter rotor adjacent said shoulder.

9. The exciter rotor assembly of claim 1 wherein said drive axle (10a) includes a differential carrier (30) fixed for rotation with said ring gear (14), said third coupling means comprising threaded fasteners (128) extending from said second exciter rotor for threaded receipt in bores (126) provided in said differential carrier.

10. The exciter rotor assembly of claim 9 wherein said first exciter rotor (116) has a through bore (130) allowing access therethrough from said other end to said threaded fasteners.

11. The exciter rotor assembly of claim 10 wherein said threaded fasteners have a head portion of larger outer diameter than the diameter of said through bore (130) in said first rotor.

12. The exciter rotor assembly of claim 9 wherein said side gear has a hub portion (48a), the outer diameter (104) and inner diameter (106) of said tubular member (102) are generally equal to the outer diameter and inner diameter, respectively, of said hub portion of said side gear.

13. The exciter rotor assembly of claim 9 wherein said tubular portion (102) defines a radially outwardly extending shoulder (120) axially interposed between said first and second exciter rotors to maintain the axial separation therebetween, said assembly also including a retaining ring (122) received on the outer diameter surface of said tubular portion for maintaining said second exciter rotor adjacent said shoulder.

14. The exciter rotor assembly of claim 1 wherein said tubular member is rotatably supported at said one end thereof.

15. A drive axle assembly (10a) including an in-axle exciter rotor assembly (100) and a speed sensor assembly (140) for sensing the rotational speed of wheels driven by said axle, said axle assembly comprising a housing (26), a driven pinion gear (12), a ring gear (14) driven by the pinion gear, a differential carrier (30) fixed for rotation with the ring gear, a differential assembly (16) driven by the differential carrier and including a first (46) and a second (48) differential side gear, first (20) and second (18) axle shafts rotatable with said first and second side gears, respectively, said wheels driven by said axle shafts, the differential assembly driving said side gears such that rotational velocity of said differential carrier equals the average rotational velocity of said side gears, said assembly characterized in that:

one of said side gears (48) has a portion (48a) defining a first outwardly facing surface (50) provided within first connecting means (112),
said carrier defines a second outwardly facing surface (52) parallel to and outboard of said first surface, said second outwardly facing surface provided with axially extending threaded bores (126) opening thereto;
said exciter rotor assembly comprising a generally tubular member (102) said tubular member having second coupling means (110) at the inboard end (108) thereof for engagement with the first connecting means provided on the side gear portion for joining said tubular member and said side gear for joint rotation;
a first exciter rotor (116) fixed to the tubular member at the outboard end (114) thereof; and
a second exciter rotor (118) axially fixed to said tubular member axially adjacent said first exciter rotor and inwardly spaced therefrom, said second rotor rotatable relative to said tubular member and provided with threaded members (128) extending inwardly therefrom for threaded receipt in said threaded bores.

16. The drive axle assembly of claim 15 wherein said first connecting means comprise axially extending slots provided in said first surface and said second coupling means comprise axially extending projection extending axially inboardly from the inboard end (108) of said tubular member.

17. The drive axle assembly of claim 16 wherein said first exciter rotor (116) has a through bore (130) allowing access from the outboard end thereof therethrough to said threaded fasteners provided in said second exciter rotor.

18. The drive axle assembly of claim 16 wherein said side gear hub portion (48a) defines an inner diameter and an outer diameter, the inner diameter (106) and outer diameter (104) of said tubular member (102) are generally equal to said inner and outer diameter of said hub portion.

19. The drive axle assembly of claim 13 wherein said tubular portion (102) defines a radially outwardly extending shoulder (120) axially interposed between said first and second exciter rotors and a retaining ring (122) is received in the outer diameter surface of said tubular member to maintain said second exciter rotor adjacent said shoulder means.

20. The drive axle assembly of claim 16 additionally comprising a speed sensor pickup assembly (140) defining a first and second speed sensor (136 and 138) axially aligned with exciter rotor teeth (132 and 134) provided on said first and second exciter rotors, respectively.

21. The drive axle assembly of claim 15 wherein said first exciter rotor (116) has a through bore (130) allowing access from the outboard end thereof therethrough to said threaded fasteners provided in said second exciter rotor.

22. The drive axle assembly of claim 15 wherein said side gear hub portion (48a) defines an inner diameter and an outer diameter, the inner diameter (106) and outer diameter (104) of said tubular member (102) are generally equal to said inner and outer diameter of said hub portion.

23. The drive axle assembly of claim 15 wherein said tubular portion (102) defines a radially outwardly extending shoulder (120) axially interposed between said first and second exciter rotors and a retaining ring (122)

is received in the outer diameter surface of said tubular member to maintain said second exciter rotor adjacent said shoulder means.

24. The drive axle assembly of claim 15 additionally comprising a speed sensor pickup assembly (140) defining a first and second speed sensor (136 and 138) axially aligned with the exciter rotor teeth (132 and 134) provided on said first and second exciter rotors, respectively.

* * * * *